United States Patent [19]

Evans et al.

[11] 4,042,924

[45] Aug. 16, 1977

[54] MTI CLUTTER TRACKING AND CANCELLING SYSTEM

[75] Inventors: Norol T. Evans, San Pedro; Francis J. Wunderlich, Placentia, both of Calif.

[73] Assignee: Hughes Aircraft Company, Culver City, Calif.

[21] Appl. No.: 17,992

[22] Filed: Feb. 25, 1970

[51] Int. Cl.² .............................................. G01S 9/42
[52] U.S. Cl. ..................................... 343/7 A; 343/7.7
[58] Field of Search .............................. 343/7 A, 7.7

[56] References Cited

U.S. PATENT DOCUMENTS

| | | | |
|---|---|---|---|
| 2,901,745 | 8/1959 | Kuhn | 343/7.7 |
| 3,742,500 | 6/1973 | Freedman | 343/7.7 |

*Primary Examiner*—T.H. Tubbesing

*Attorney, Agent, or Firm*—Rafael A. Cardenas; Walter J. Adam; W. H. MacAllister

[57] ABSTRACT

A clutter tracking and cancelling system, for use in a MTI radar system, comprising an auxiliary channel consisting primarily of a phase detector and a canceller. The phase detector provides an output which represents the phase difference between the IF and the coho output, while the output of the canceller, which responds to the phase detector output, represents clutter MTI residue from one transmission to the next. Clutter MTI residue from several successive range bins is smoothed and integrated to provide a control output which is used to shift the phase of the coho frequency, which is supplied to the phase detector in the conventional main MTI channel, to set the mean clutter velocity at zero velocity in order to produce optimum clutter cancellation in the main MTI channel.

16 Claims, 8 Drawing Figures

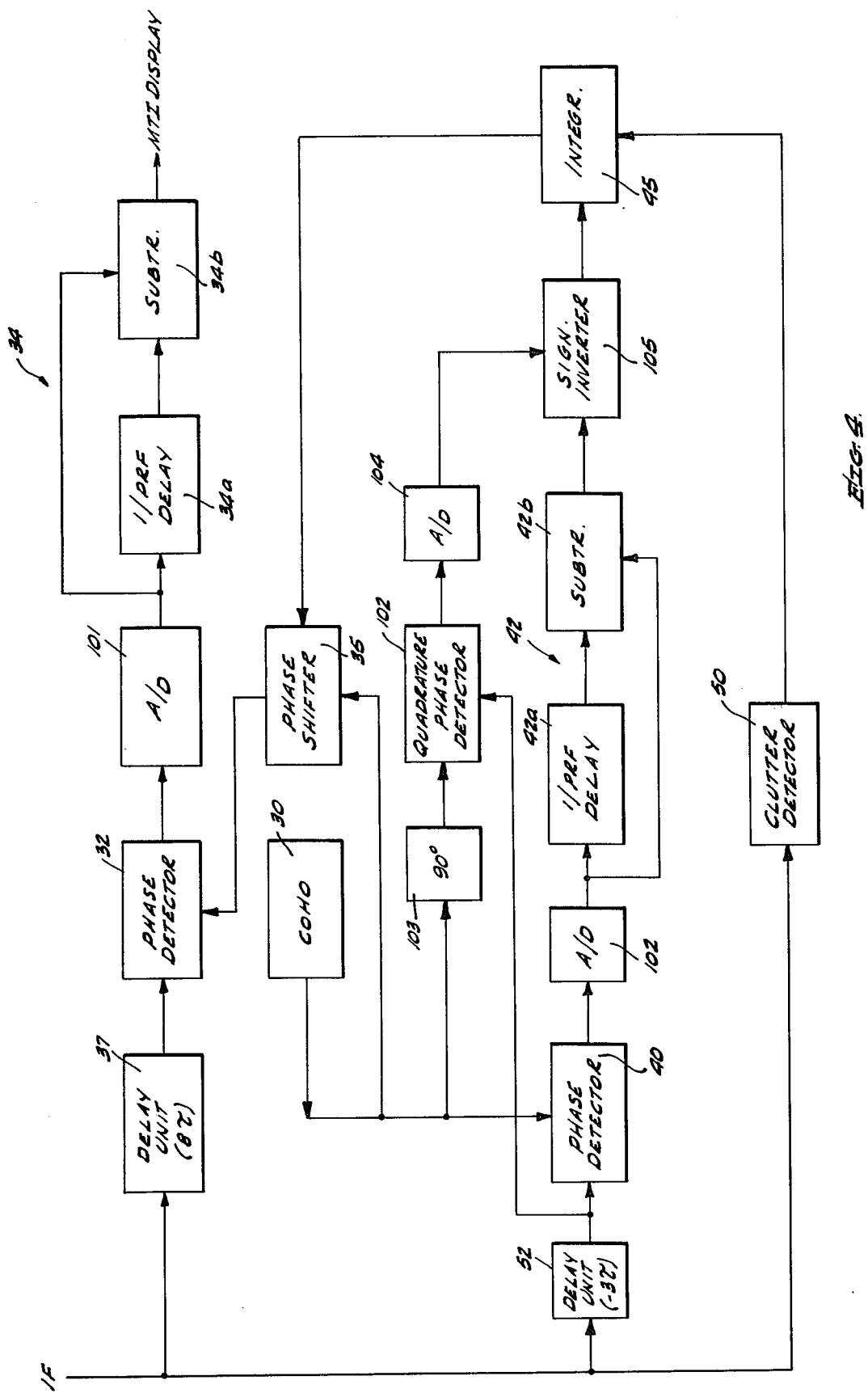

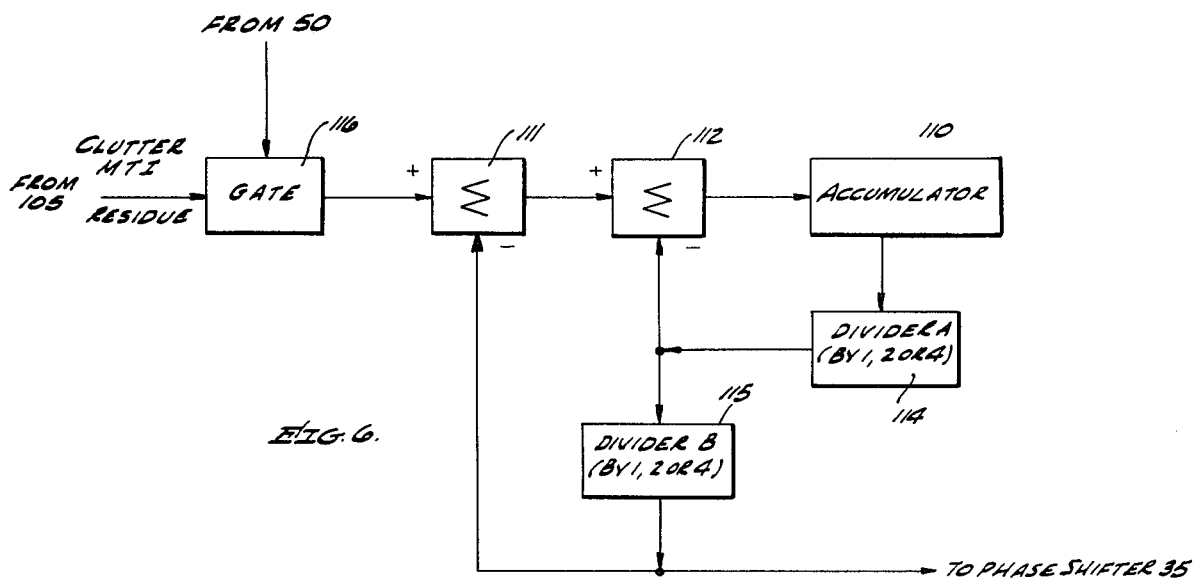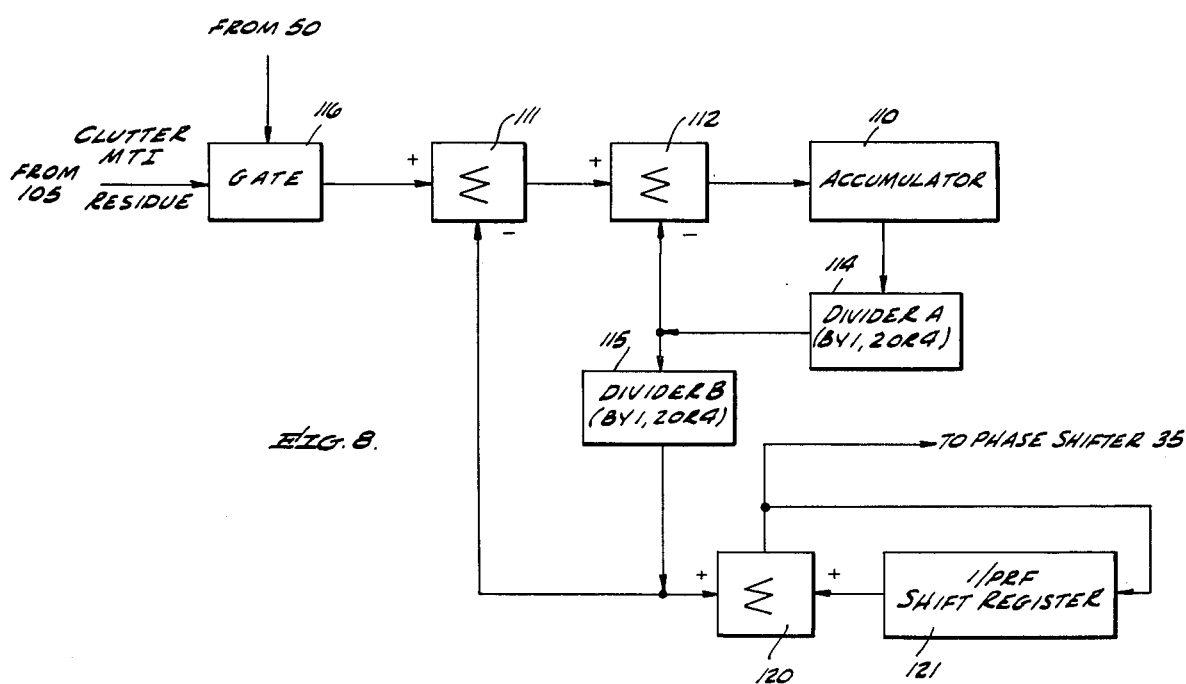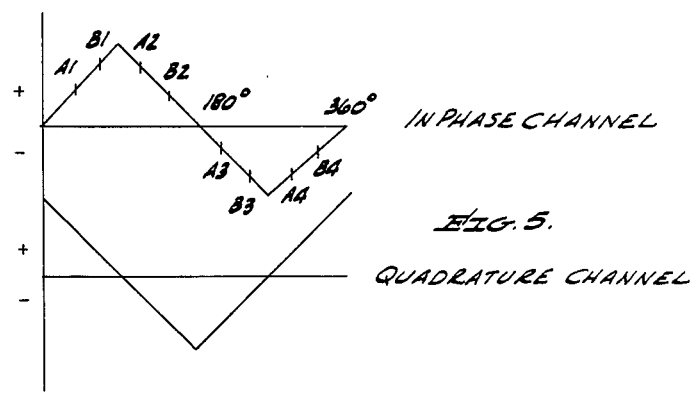

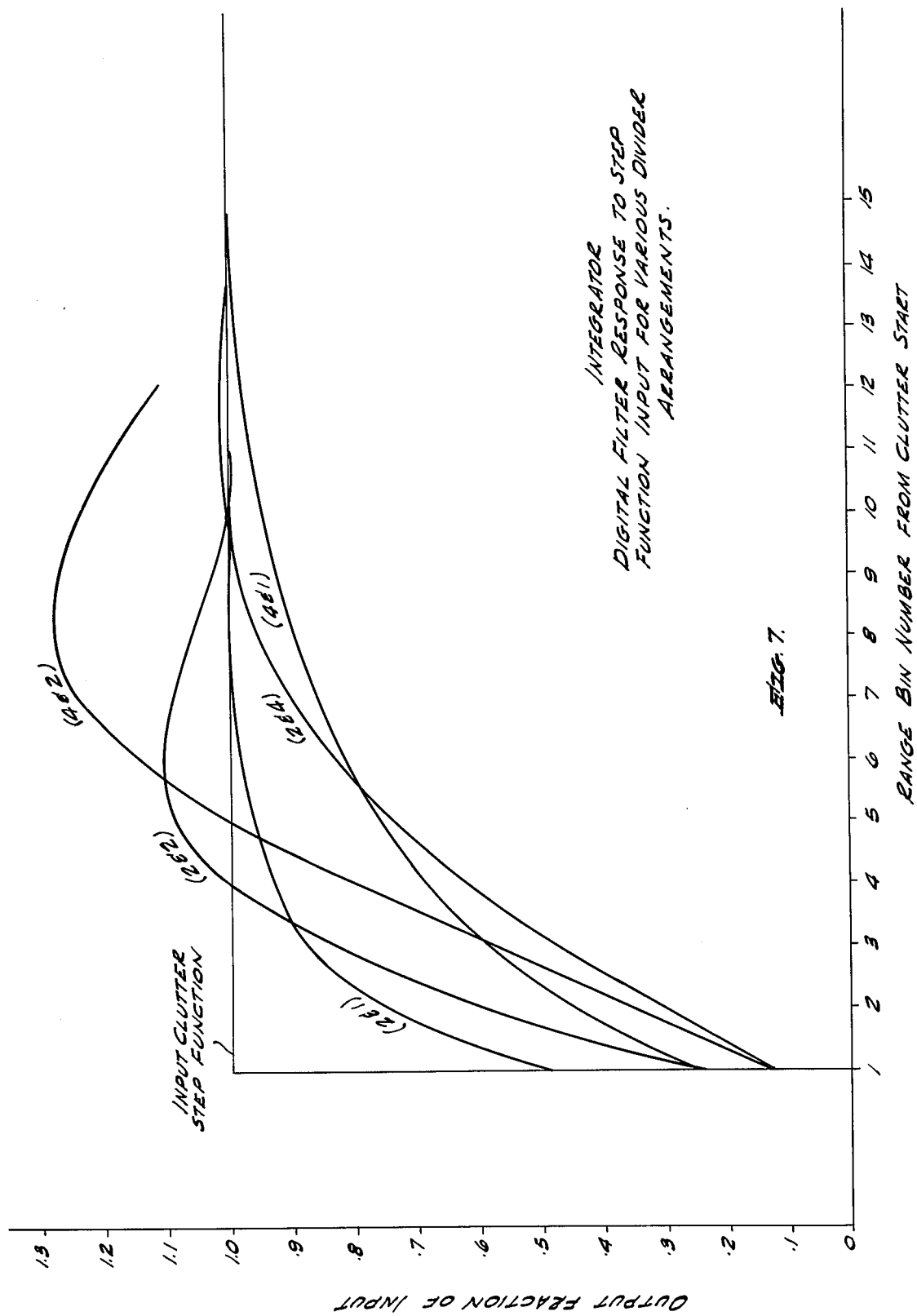

MTI CLUTTER TRACKING AND CANCELLING SYSTEM

BACKGROUND OF THE INVENTION

1. Field of the Invention

The present invention generally relates to improvements in a radar system and, more particularly, to an improved clutter tracker in a moving target indication (MTI) radar system.

2. Description of the Prior Art

Different MTI radar systems are known in the art. Such systems are capable of extracting the echo or returns of a moving target from the echo of clutter, even though the clutter echo may be many fold greater in amplitude than the moving target echo. This is accomplished by tracking the clutter and removing, or at least minimizing, its effect on the display on which the real targets are indicated. Various techniques have been employed to cancel the effect of stationary clutter. Some systems have also been developed to track moving clutter and cancel its effect in a fully automated MTI radar system, in which target indication signals are automatically produced, in order to minimize the number of false target indication signals.

In one such system, sometimes referred to as "TACCAR" for time average clutter coherent airborne radar, average doppler velocity of moving clutter is measured for clutter cancellation. In this system, if the clutter velocity changes in range, the system tracks the geometric mean of the observed clutter velocities. Consequently, the system yields unsatisfactory results in environments in which clutter of different velocities, such as ground clutter, rain and chaff are encountered. Also, the system is relatively slow and therefore it cannot be used effectively with a step scan radar.

In another system, which has been proposed, although some clutter is cancelled, the leading and trailing edges of the clutter are not cancelled. Consequently, a fairly high rate of false target indications are produced, i.e., a fairly high false alarm rate occurs. Various clutter gating schemes have been tried to alleviate this problem. However, to date such schemes have only met with very limited success.

OBJECTS AND SUMMARY OF THE INVENTION

It is a primary object of the present invention to provide a new clutter tracking and cancelling system for use in a MTI radar system.

Another object of the invention is to provide a system, for use in a MTI radar system, which is capable of tracking clutter moving at different velocities at different ranges.

A further object of the present invention is to provide a moving clutter tracking and cancelling system in which the clutter leading and trailing edges are effectively cancelled.

Still a further object of the present invention is to provide a new moving clutter tracking and cancelling system with a fast transient response, making the system compatible with the fast response required in a step scan radar system.

As is appreciated by those familiar with the art, in any conventional coherent MTI radar receiver the IF, produced therein, is supplied to a phase detector, which is also supplied with the coherent reference frequency from the coho. The output of the phase detector is supplied to the MTI canceller, and, therefrom, to an appropriate MTI display. Unlike such a conventional MTI radar receiver, in accordance with the teachings of the present invention, a phase shifter is placed in the signal path between the coho and the phase detector of the main MTI channel. This phase shifter is made to shift the coho phase by a proper amount to set the mean clutter velocity at zero velocity which gives optimum cancellation of the clutter in the main MTI channel.

The control of the phase shifter is achieved by providing an additional MTI channel to measure the phase shift, also known as MTI residue, of detector clutter from one transmission to the next. The clutter MTI residue of several successive range bins are smoothed and integrated and their average is used to control the phase shifter which shifts the phase of the MTI radar receiver coho, which is supplied to the phase detector of the main MTI channel.

The novel features of the invention are set forth with particularity in the appended claims. The invention will best be understood from the following description when read in conjunction with the accompanying drawings.

BRIEF DESCRIPTION OF THE DRAWINGS

FIG. 4 is a more detailed diagram of the present invention;

FIG. 5 is a diagram of two curves useful in explaining the need for some of the circuitry shown in FIG. 4;

FIG. 6 is a block diagram of one embodiment of an integrator, shown in FIG. 4;

FIG. 7 is a diagram useful in explaining the characteristics of the integrator; and FIG. 8 is a block diagram of another embodiment of the integrator.

DESCRIPTION OF THE PREFERRED EMBODIMENTS

Figure 1:
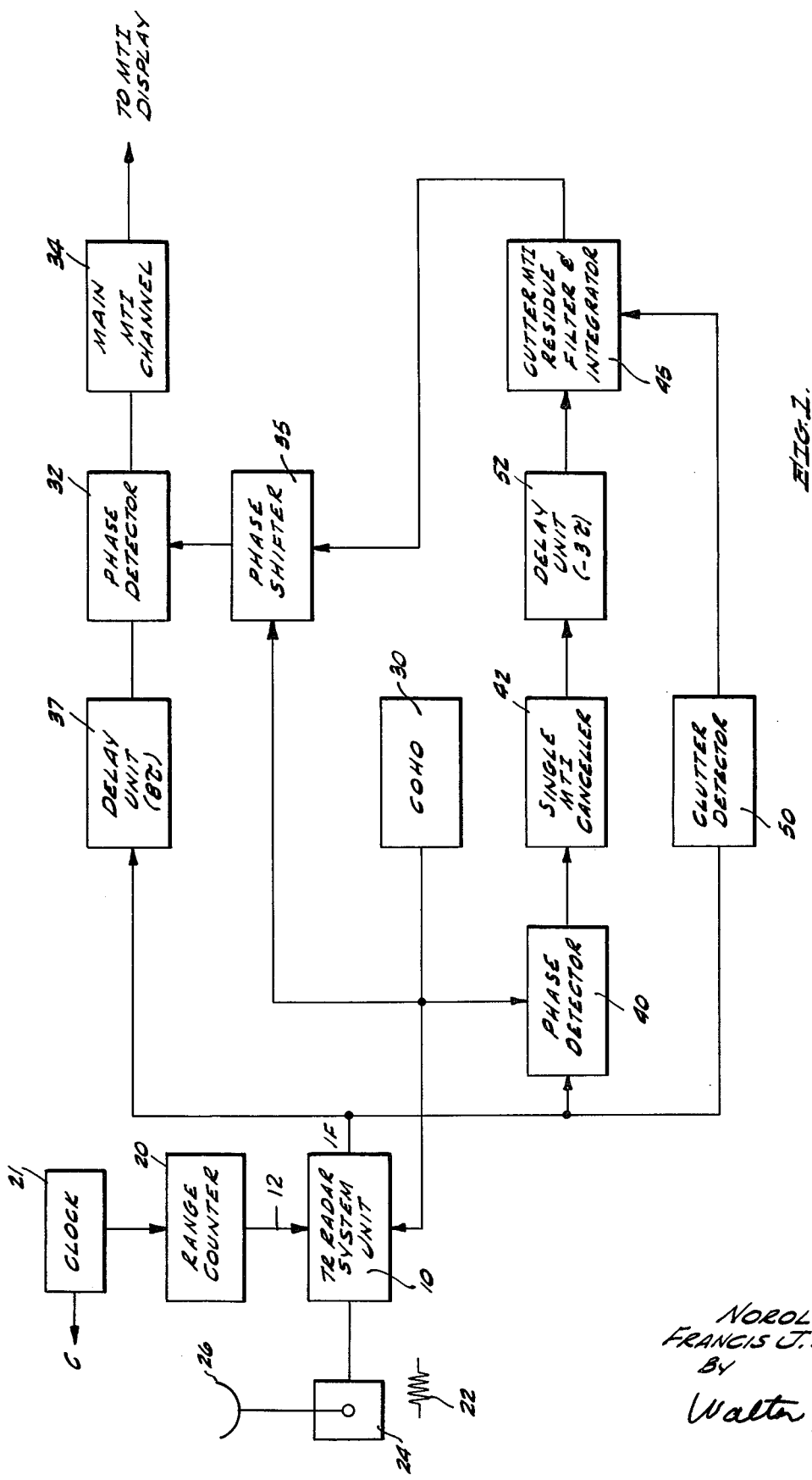
FIG. 1 is a block diagram of a MTI radar system incorporating the present invention.

Attention is now directed to FIG. 1 which is a block diagram of a MTI system, which incorporates the present invention. The MTI radar system is shown including a transmitter-receiver (TR) radar unit 10 which is synchronized by a master trigger signal, supplied thereto by line 12 from a master range counter 20, which is in turn triggered by clock pulses C from a clock 21.

Pulses of energy of a waveform 22 are applied to an antenna system 24 which is shown including antenna 26. The energy pulses transmitted into space by the antenna 26 and intercepted thereby after being reflected from objects, such as targets of interest or clutter, are supplied to the receiver portion of radar system 10. Therein the pulses are mixed in a conventional manner to develop intermediate frequency video return signals, referred to in the art as IF video signals, or simply IF. In a conventional MTI radar, the frequency and phase of such signals are analyzed with respect to a reference frequency to detect moving targets, by sensing the changes in the IF video signals, due to the doppler frequency shifts introduced by the moving targets. This reference frequency is provided by a coherent frequency oscillator or coho 30.

Such frequency comparisons are generally performed in phase detectors, the outputs of which are functions of the frequency or phase differences of two coherent frequencies supplied thereto. One such detector is shown in FIG. 1 and is designated by numeral 32. The output of the phase detector is then supplied to a main MTI channel 34, which includes a MTI canceller, the output of which is supplied to an appropriate MTI display. Such a system does not include any clutter tracking and cancelling arrangement.

Unlike such a conventional MTI radar, in accordance with the teachings of this invention, the coho output is supplied to the main channel phase detector 32 through a phase shifter 35. As will be described hereafter in detail, phase shifter 35 is controlled to shift the phase of the reference frequency from coho 30 so as to optimize the cancellation of clutter in the main MTI channel. Also, unlike a conventional MTI radar, in the present invention the IF is supplied to the phase detector 32 through a delay unit 37 which delays the IF by an amount, or time period, representing a selected number of range bins, such as 8. As will be pointed out hereafter, this delay is needed to compensate for the time which is required to detect and track the clutter, as well as by the range over which the clutter effect is integrated.

In accordance with the present invention, clutter is tracked by means of a single additional MTI channel which consists of a phase detector 40 and a single canceller 42. The IF and the unshifted coho output are supplied to the phase detector 40, whose output is supplied to the MTI canceller 42. As shown in FIG. 1, the output of canceller 42 is supplied to a clutter MTI residue filter and integrator 45, which for simplicity may hereafter be referred to as integrator 45. The output of integrator 45 controls the phase by which phase shifter 35 shifts the coho frequency so as to set the mean clutter velocity at zero velocity and thereby produce optimum clutter cancellation in the main MTI channel.

Preferably, the novel clutter tracking and cancelling system of the present invention includes a clutter detector 50 to which the IF is supplied. The function of the detector is to provide an enabling or activating signal to integrator 45 only if clutter is detected in several, for example 3, successive range bins. Clutter is assumed to be detected if the IF from each of 3 successive range bins exceeds a selected threshold level. When incorporating such a 3 range bin clutter detector, the output of canceller 42 is supplied to integrator 45 through a delay unit 52. Unit 52 provides a delay which together with the delay produced in detector 40 and canceller 42, the total delay is equal to 3 range bins. Representing the time interval corresponding to one range bin by $1\tau$, the total delay provided by unit 52 is less than $3\tau$ (or $-3\tau$) so that together with the delay produced by units 40 and 42, the total delay in the chain of units 40, 42 and 52 equals $3\tau$, which matches the delay caused by detector 50. The delay unit 52 may be interposed between the TR radar unit 10 and the detector 40, as shown in FIG. 4.

Basically, in accordance with the present invention, the phase detector 40 and the canceller 42 track the MTI residue for each range bin, from one transmission to the next. When clutter is detected by detector 50, which in the present example is assumed to be the case when IF in three successive range bins exceeds a given threshold level, the output of canceller 42 is for all practical purposes clutter MTI residue. This is based on the assumption that the MTI residue of real targets is usually much smaller than the residue of the clutter and that real targets are not 3 range bins wide. Thus, the clutter MTI residue is supplied to integrator 45 wherein the residue from several successive range bins, e.g., 5, is smoothed by integration. This average is then used to control the phase shifter 35 in order to shift the reference frequency of coho 30 to set the mean clutter velocity at zero velocity and thereby produce optimum clutter cancellation in the main MTI channel. Such an arrangement eliminates or at least greatly minimizes the effect of the clutter from the IF which is directly supplied to phase detector 32, whose output is intended to represent the actual moving targets of interest.

In the present example, since clutter detection is based on the presence of IF above a selected threshold level in 3 range bins, and phase correction for clutter cancellation is based on the integration of clutter MTI residue in 5 successive range bins, the IF which is supplied to detector 32 is delayed by unit 37 by 8 range bins ($8\tau$). As will be described hereafter in connection with a specific example, integrator 45, in addition to averaging the clutter MTI residue over several (5) range bins also stores for each range bin a correction value. As a result, for the IF of each range bin, proper accumulated phase correction of the coho frequency is produced, to eliminate the effect of clutter therein. This is necessary in a radar system in which more than two successive transmissions take place, in order to account for the accumulated clutter MTI residue over several transmissions.

Figure 2:
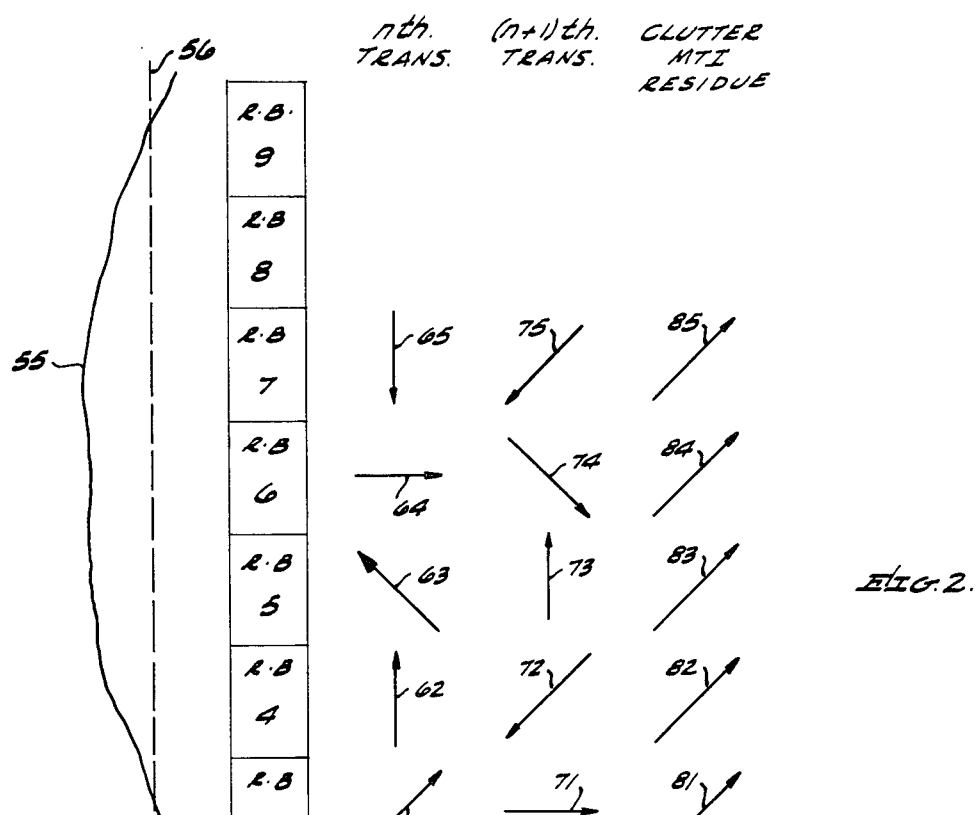
FIG. 2 is a multicolumn diagram useful in explaining the principles of operation of the present invention.

The mode of operation and the advantages of the present invention may further be explained in conjunction with FIG. 2 wherein 9 successive range bins RB1 through RB9 are diagrammed. Clutter represented by line 55 is assumed to be present in RB3 through RB9. The IF from part of this clutter is assumed to exceed a threshold level, designated by line 56. When IF above the threshold level from 3 successive range bins RB3-RB5, is detected by detector 50, clutter is assumed to be detected. As a result, detector 50 enables integrator 45. The latter in essence accumulates and smooths the clutter MTI residue from range bin to range bin and provides an integrated phase correction to phase shifter 35. In one preferred embodiment of integrator 45, the clutter MTI residue is operated so that the accumulation of clutter MTI residue of five successive range bins provides optimum clutter cancellation.

In the particular example, herebefore described, the integrator 45 integrates the clutter MTI residue for range bins RB3-RB7. It should be pointed out that due to this smoothing integration, the phase correction for clutter cancellation at each range bin is based on the integrated clutter MTI residue in five successive range bins including the particular range bin of interest, rather than on the specific clutter MTI residue of the particular range bin. Such averaging has been found to enhance the clutter cancelling capability of the system, rather than to limit its performance. The purpose of smoothing the clutter residue over more than one range bin is to reduce the effects of the receiver noise on the process.

Attention is again directed to FIG. 2 wherein arrows 61-65 represent, in vector form, the phase angles of the clutter returns or IF from range bins RB3-RB7 from a single, such as the $n^{th}$ transmission. Assuming that the clutter in this interval is moving at the same average velocity, causing a vector or phase rotation in the clockwise direction of 45°, the returns of the next $(n+1)$th transmission may be represented by arrows 71-75. It should be pointed out that even though the phase of the clutter returns is independent from one range bin to the next, the cancelled residue, provided by canceller 42 is in phase from one range bin to the next, as represented by arrows 81-85. Thus, these residues could be averaged in the integrator 45 to provide an average clutter residue, without danger that the various independent vectors would add up to or near zero, and thereby cause the phase of the coho to be locked to the receiver noise.

Figure 3:
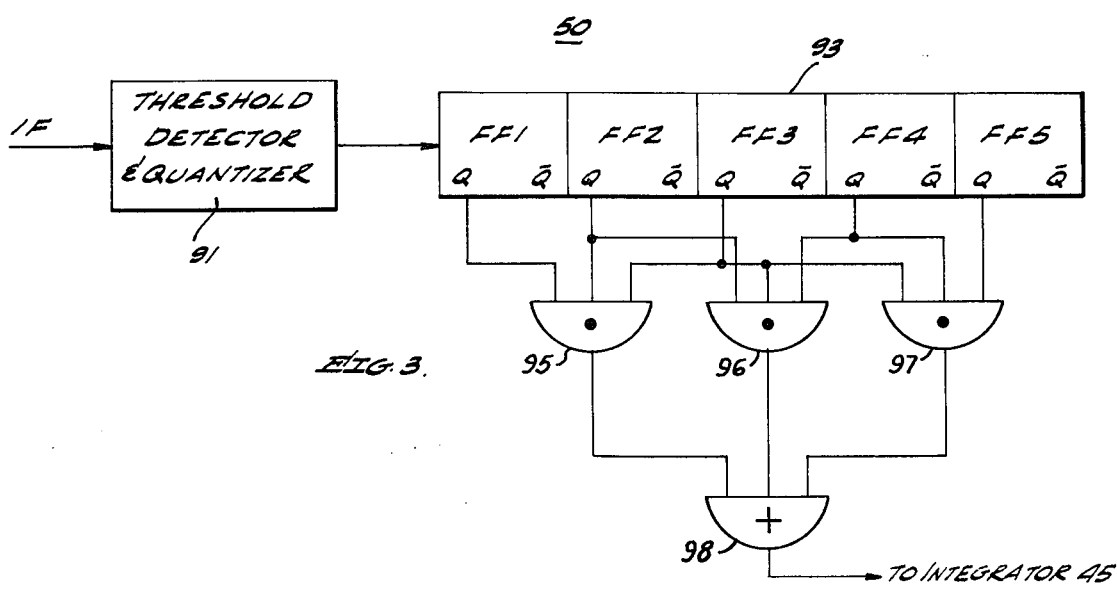
FIG. 3 is a block diagram of a clutter detector, shown in FIG. 1.

Reference is now made to FIG. 3 which is a block diagram of one implementation of the clutter detector 50. The detector includes a threshold detector and quantizer 91, and a five stage shift register 93, the latter consisting of FF1 through FF5. The Q outputs of each three successive stages are gated by an AND gate. The three AND gates are designated 95, 96 and 97. Their outputs are supplied to an OR gate 98 whose output represents an enabling signal for integrator 45.

The IF is supplied to threshold detector and quantizer 91. If it exceeds the selected threshold level, a binary 1 is assumed to be supplied to register 93, while a binary 0 is stored therein if the IF level is below the threshold level. The shift register 93 is assumed to be clocked by the range counter 20. Thus, only when the IF from each of three successive range bins exceeds the threshold level are binary 1's stored in three successive FF's of the register. As a result, one of the AND gates has a true output which enables OR gate 98 to provide a true output, which represents clutter detection.

Reference is now made to FIG. 4 in which elements like those previously described are designated by like numerals. FIG. 4 is a block diagram of an arrangement which was actually reduced to practice with digital circuits wherever feasible, in order to minimize the system's response time so that it could be used with a step scan radar system. As shown, the outputs of the phase detectors 32 and 40 are converted into digital values by A/D converters 101 and 102 respectively, prior to being supplied to the main channel canceller 34, and to the auxiliary channel canceller 42. The cancellers are shown in the conventional fashion, as consisting of a delay unit which provides a delay of one over the pulse repetition frequency (1/PRF) and a subtractor. The canceller output represents the phase difference of the returns for each range bin from two successive transmissions. The delay unit and subtractor of canceller 34 are designated as 34a and 34b, respectively, while the delay unit and the subtractor of canceller 42 are designated by 42a and 42b, respectively.

In addition to the aforementioned circuits, the novel system of the present invention includes a quadrature phase detector 102, a 90° phase shifter 103, and A/D converter 104 and a sign inverter 105. In operation, the detector 102 is supplied with the IF, after being delayed by delay unit 52. The detector is also supplied with the coho output. However, in order to serve as a quadrature detector while the detector 40 serves as the in-phase detector, the coho output, which is supplied to the detector 102, is delayed by 90° by phase shifter 103. The output of detector 102 is converted into a digital number by A/D converter 104. The sign of this number is used to control the sign or polarity of the output of canceller 42 by controlling the state of the sign inverter 105.

The reason for the incorporation of the quadrature phase detector and the use made thereof may best be explained in conjunction with FIG. 5 to which reference is now made. FIG. 5 illustrates a basic problem encountered in phase detectors. Assume the $A_i$ represents the phase detector output at the $i^{th}$ range bin on a transmission or range sweep A, and $B_i$ represents the phase detector output on sweep B at the $i^{th}$ range bin. The output of the MTI canceller is then $(A_i-B_i)$. If the difference $(A_i-B_i)$ is in the first or fourth quadrant, the difference is negative, whereas if the difference is in the 2nd or 3rd quadrant, the difference is positive. This ambiguity may be resolved by using the sign of a quadrature detector such that when the sign of the quadrature detector is negative, the polarity of the in-phase canceller difference signal is inverted. It is to resolve this ambiguity that circuits 103, 102, 104 and 105 are included in the arrangement, shown in FIG. 4.

As previously explained, the function of the integrator 45 is to smooth and integrate the clutter MTI residue which is supplied from the canceller 42, and to provide the phase correction signal to phase shifter 35 in order to eliminate, or at least minimize, the effect of clutter from the IF which is supplied to detector 32. As previously stated, in one specific example, the smoothing or integration is performed so that after the clutter MTI residue of five successive range bins is smoothed and integrated nearly 100% clutter cancellation is achieved. Clearly, the number of five range bins is only one example of a practical implementation. The MTI residue of more or less than five range bins may be integrated. Herebefore, it has been assumed that the preferred embodiment in which the clutter detector 50 is incorporated, no clutter MTI residue is operated upon by the integrator 45 until an activating signal is supplied from the clutter detector 50.

It should be appreciated by those familiar with circuit design that various techniques may be employed in the actual implementation of the integrator 45. For example, it may consist of an accumulator whose output is divided by five to provide the desired phase correction to phase shifter 35. More elaborate circuit arrangements may be employed to provide a higher rate of partial phase correction within less than 5 range bins $(5\tau)$, even though nearly 100% phase correction is achieved after 5 range bins. This may be achieved by implementing the integrator 45 as a variable digital filter to produce the desired partial phase correction in a specified range bin interval. In one actual reduction to practice to be described hereafter in connection with FIG. 6, 95% correction on the leading edge of clutter is achieved with a time constant of $2.5\tau$.

In FIG. 6, the integrator 45 is shown comprising an accumulator 110 and two summers 111 and 112. Each summer, in practice, provides an output which is the difference between the inputs at the summer's (+) and (−) inputs. The integrator also includes two dividers 114 and 115, each being operable to divide its input by a factor of 1, (2) or (4). In order to control the integrator to respond to clutter MTI residue only if clutter is detected in several (e.g., 3) successive range bins as heretofore explained, the integrator 45 also includes a gate 116. This gate enables clutter MTI residue to be supplied to summer 111 only if an enabling signal is supplied to the gate 116 by clutter detector 50. The output of the integrator 45 is represented by the output of divider 115.

The performance of the integrator as shown in FIG. 6 may best be summarized in conjunction with FIG. 7 wherein different ones of the curves display various time constants to achieve different partial corrections as a function of different settings of dividers 114 and 115. Each curve is labeled in accordance with the respective divider settings with divider 114 listed first. For example, the label (2 and 4) indicates that divider 114 is set to divide by 2 and divider 115 is set to divide by 4. The curves show the transient response to a step function of input clutter. That is, equal clutter of unity amplitude in successive range bins. The selection of the divider arrangement depends upon three factors which may have different weightings for different applications. These are: 1) low initial response is desired in the first range bin to reduce the chance of desensitizing actual targets; 2) a fast response (steep rise) is desired to be adaptive to changing clutter velocities as a function of range; 3) a slow response (slow rise time/ long time constant) is desired to maximize the filtering (smoothing) action so that receiver noise is not received in the MTI channel. If the particular application does not require rapid response, an arrangement like (2 and 4) can be quite optimum because it has a modulately fast response with just a very small percentage overshoot beginning at about 10 range bins. As shown in FIG. 7, a setting of (4 and 1), a much smaller response time is produced with such a setting clutter in 11 range bins is integrated or smoothed to provide 95% clutter correction.

The phase correction for clutter cancellation provided by the integrator as shown in FIG. 6 is only satisfactory for a radar system in which only two transmissions or range sweeps are directed at each step or azimuth position. This is true since the single MTI channel, consisting primarily of phase detector 40 and canceller 42 provides clutter MTI per range bin from one transmission to the next. In radar systems in which more than two transmissions take place, it is necessary to keep a running count of prior phase corrections for each range bin and add it to the latest smoothed phase correction, provided by the integrator.

This may be accomplished by adding a summer and a shift register to the integrator 45 as shown in FIG. 8 to which reference is now made. Therein, the summer and the shift register are designated by numerals 120 and 121, respectively. Basically, the shift register represents a circulating memory with a separate cell for each range bin in the sweep. The register output is summed by summer 120 with the latest smoothed phase correction and the sum is supplied to the phase shifter 35 as the lastest correction. This sum is also entered into the shift register as the latest correction for the particular range bin, so that at the next transmission, i.e., 1/PRF later, the last correction is again available at the register output for a subsequent addition with the latest smoothed phase correction for the clutter in the particular range bin.

There has accordingly been shown and described herein a novel clutter tracking and cancelling system for use in a MTI radar system. The novel system consists of an additional MTI channel whose output is integrated and smoothed over a selected number of range bins if clutter is detected in several successive range bins. The integrated and smoothed output is used to control a phase shifter which shifts the phase of the coho output which is supplied to the phase detector of the main MTI channel. The effect of shifting the phase of the coho output is to set the clutter velocity to zero velocity and thereby produce optimum clutter cancellation in the main MTI channel.

Although particular embodiments of the invention have been described and illustrated herein, it is recognized that modifications and variations may readily occur to those skilled in the art and consequently it is intended that the claims be interpreted to cover such modifications and equivalents.

What is claimed is:

1. In a moving target indication radar system of the type including means for transmitting energy of a predetermined frequency which is reflected by targets including clutter, means for receiving said reflected energy, a coherent source of energy of a fixed frequency, means for converting the reflected energy into intermediate frequency signals from each of a succession of range bins from which said energy was reflected, a main phase detector to which said intermediate frequency signals and the energy from said coherent source are applied and a main canceller for providing an output representing moving-target-indication residue from one transmission to the next, a clutter detection and cancelling system comprising:

a phase shifter;
means for connecting said phase shifter between said coherent source of energy and said main phase detector;
phase detecting means responsive to said intermediate frequency signals and to said coherent energy from said source for providing for each range bin an output related to the clutter therein;
cancelling means responsive to the output of said phase detecting means for providing a clutter moving target indication residue from transmission to transmission;
filtering and integrating means for filtering and integrating said clutter moving target indication residue; and
means for connecting said filtering and integrating means to said phase shifter to control the phase shift provided thereby as a function of the filtered and integrated clutter moving target indication residue.

2. The arrangement as recited in claim 1 wherein said phase detecting means include an in-phase phase detector responsive to said intermediate frequency signals and to said coherent energy from said source, with the output of said in-phase phase detector being supplied to said cancelling means, said phase detecting means further including a phase shifter for shifting the phase of said coherent energy by 90°, a quadrature phase detector responsive to said intermediate frequency signals and to the output of said 90° phase shifter, and means for controlling the sign of the output of said cancelling means which is supplied to said filtering and integrating means as a function of the output of said quadrature phase detector.

3. The arrangement as recited in claim 1 wherein said filtering and integrating means include means for providing an output to control said phase shifter which is at least a function of the clutter residues from a preselected number of range bins, defining a preselected range bin interval.

4. The arrangement as recited in claim 3 wherein said filtering and integration means include summing means responsive to said moving target indication residue being coupled to said cancelling means, an accumulator being coupled to said summing means, variable dividing means being coupled to said summing means and to said accumulator, said variable dividing means being coupled to said phase shifter for controlling the rate at which the output of said filtering and integration means becomes a function of the clutter residue over said range bin interval.

5. The arrangement as recited in claim 3 further including means in said filtering and integrating means for storing for each range bin the output of said filtering and integrating means which is supplied to said phase shifter to correct the phase of the intermediate frequency signals received from said range bin from one transmission, and adding means for adding the stored output to a value in said filtering and integrating means which represents the integrated value of clutter residues of said preselected range bin interval during a succeeding transmission and for providing an output to said phase shifter and to said means for storing which represents the addition performed by said adding means.

6. The arrangement as recited in claim 4 wherein said phase detecting means include an in-phase phase detector responsive to said intermediate frequency signals and to said coherent energy from said source, with the output of said in-phase phase detector being supplied to said cancelling means, said phase detecting means further including a phase shifter for shifting the phase of said coherent energy by 90°, a quadrature phase detector responsive to said intermediate frequency signals and to the output of said 90° phase shifter, and means for controlling the sign of the output of said cancelling means which is supplied to said filtering and integrating means as a function of the output of said quadrature phase detector.

7. The arrangement as recited in claim 5 wherein said phase detecting means include an in-phase phase detector responsive to said intermediate frequency signals and to said coherent energy from said source, with the output of said in-phase phase detector being supplied to said cancelling means, said phase detecting means further including a phase shifter for shifting the phase of said coherent energy by 90°, a quadrature phase detector responsive to said intermediate frequency signals and to the output of said 90° phase shifter, and means for controlling the sign of the output of said cancelling means which is supplied to said filtering and integrating means as a function of the output of said quadrature phase detector.

8. In a moving target indication radar system of the type including means for transmitting energy of a predetermined frequency which is reflected by targets including clutter, means for receiving said reflected energy, a coherent source of energy of a fixed frequency, means for converting the reflected energy into intermediate frequency signals from each of a succession of range bins from which said energy was reflected, a main phase detector to which said intermediate frequency signals and the energy from said coherent source are applied and a main canceller for providing an output representing moving-target-indication residue from one transmission to the next, a clutter detection and cancelling system comprising:
a moving target indication clutter channel responsive to said intermediate frequency signals and to said coherent energy for providing a clutter moving target indication residue for each range bin from transmission to transmission; and
control means responsive to said clutter residue for controlling the phase of the energy from said coherent source which is applied to the main phase detector.

9. The arrangement as recited in claim 8 wherein said control means include a phase shifter connected between said coherent source of energy and said main phase detector for controlling the phase of the energy from said coherent source which is applied to said main phase detector as a function of the clutter residue supplied to said control means.

10. The arrangement as recited in claim 9 wherein said control means include clutter detecting means coupled to said main phase detector and clutter residue filtering and integrating means coupled to said clutter detector, said clutter residue filtering and integrating means providing a phase shifting control signal to said phase shifter as a function of clutter residue from a selected number of range bins, defining a range bin interval.

11. The arrangement as recited in claim 10 wherein said filtering and integration means include summing means responsive to said moving target indication residue being coupled to said coherent source of energy, an accumulator being coupled to said summing means, variable dividing means being coupled to said summing means and to said accumulator, said variable dividing means being coupled to said phase shifter for controlling the rate at which the output of said filtering and integration means becomes a function of the clutter residue over said range bin interval.

12. The arrangement as recited in claim 11 further including means in said filtering and integrating means for storing for each range bin the output of said filtering and integrating means which is supplied to said phase shifter to correct the phase of the intermediate frequency signals received from said range bin from one transmission, and adding means for adding the stored output to a value in said filtering and integrating means which represents the integrated value of clutter residues of said preselected range bin interval during a succeeding transmission and for providing an output to said phase shifter and to said means for storing which represents the addition performed by said adding means.

13. The arrangement as recited in claim 12 further including clutter detecting means responsive to said intermediate frequency signals for providing an enabling signal to said clutter residue filtering and integrating means to respond to said clutter residue only when intermediate frequency signals from each of a selected number of associated range bins exceed a preselected threshold level.

14. The arrangement as recited in claim 10 wherein said clutter detecting means provides said enabling signal only when the intermediate frequency signals from each of a selected number of successive range bins exceed said preselected threshold level.

15. The arrangement as recited in claim 14 wherein said clutter residue filtering and integrating means include a pair of variable dividers for controlling the rate at which the phase shifting control signal represents the integrated value of the clutter residue from said range bin interval.

16. The arrangement as recited in claim 15 further including means in said filtering and integrating means for storing for each range bin the output of said filtering and integrating means which is supplied to said phase shifter to correct the phase of the intermediate frequency signals received from said range bin from one transmission, and adding means for adding the stored output to a value in said filtering and integrating means which represents the integrated value of clutter residues of said preselected range bin interval during a succeeding transmission and for providing an output to said phase shifter and to said means for storing which represents the addition performed by said adding means.

* * * * *